United States Patent
Komori

(10) Patent No.: US 7,418,129 B2
(45) Date of Patent: Aug. 26, 2008

(54) IMAGE PROCESSING DEVICE METHOD AND PROGRAM

(75) Inventor: Yoko Komori, Kanagawa (JP)

(73) Assignee: Sony Corporation, Tokyo (JP)

(*) Notice: Subject to any disclaimer, the term of this patent is extended or adjusted under 35 U.S.C. 154(b) by 569 days.

(21) Appl. No.: 10/545,847

(22) PCT Filed: Dec. 25, 2003

(86) PCT No.: PCT/JP03/16681

§ 371 (c)(1),
(2), (4) Date: Aug. 17, 2005

(87) PCT Pub. No.: WO2004/075113

PCT Pub. Date: Sep. 2, 2004

(65) Prior Publication Data

US 2006/0158535 A1      Jul. 20, 2006

(30) Foreign Application Priority Data

Feb. 19, 2003   (JP) .................... 2003-040661

(51) Int. Cl.
*G06K 9/00* (2006.01)
(52) U.S. Cl. .................................................. 382/162
(58) Field of Classification Search ............ 382/162, 382/167; 348/223.1; 358/448, 464, 500, 358/518–521, 532
See application file for complete search history.

(56) References Cited

U.S. PATENT DOCUMENTS 5,208,663 A * 5/1993 Hiratsuka et al. ........... 358/500
5,680,230 A * 10/1997 Kaburagi et al. ............ 358/520
5,742,410 A * 4/1998 Suzuki ....................... 358/518
6,919,924 B1 * 7/2005 Terashita .................. 348/223.1

FOREIGN PATENT DOCUMENTS

| JP | 1-296234 | 11/1989 |
|---|---|---|
| JP | 2-291778 | 12/1990 |
| JP | 5 6427 | 1/1993 |
| JP | 5-292303 | 11/1993 |
| JP | 5-307599 | 11/1993 |
| JP | 7-87345 | 3/1995 |
| JP | 2001-202073 | 7/2001 |

* cited by examiner

*Primary Examiner*—Jose L Couso
(74) *Attorney, Agent, or Firm*—Frommer Lawrence & Haug LLP; William S. Frommer

(57) ABSTRACT

The present invention relates to an apparatus, a method, and a program for processing images that can reproduce images in which color tones are preserved even when a luminance signal level is changed by gradation conversion. A Y-matrix unit 112 and a C-matrix unit 113 convert an original color obtained from image-sensing devices 111 to luminance signals and color-difference signals. A gradation-correction unit 114 performs gradation adjustment on luminance signals Y and convert them to luminance signals Y' to be output. The gradation-correction unit 114 further converts the luminance signals Y' to signals Y', which are Y signals according to the XYZ color system, and outputs them to a color-difference correction unit 115. The color-difference correction unit 115 calculates values h1 and h2 corresponding to hue H and chroma C according to the Munsell color system, and calculates X' and Z' according to the XYZ color system after gradation correction so as to preserve the hue H and the chroma C, based on the signals Y', which are Y signals according to the XYZ color system after the gradation adjustment. The present invention can be applied to products for performing digital image processing.

15 Claims, 16 Drawing Sheets

FIG. 4

| V/C | Yc(%) | BG | | | | | | | | |
|---|---|---|---|---|---|---|---|---|---|---|
| | | 2.5 BG | | 5.0 BG | | 7.5 BG | | 10.0 BG | |
| | | x | y | x | y | x | y | x | y |
| 4/24 | 11.70 | 0.0510 | 0.3800 | — | — | — | — | — | — |
| 22 | | 0.0636 | 0.3788 | — | — | — | — | — | — |
| 20 | | 0.0768 | 0.3773 | — | — | — | — | — | — |
| 18 | | 0.0915 | 0.3754 | 0.0675 | 0.3075 | — | — | — | — |
| 16 | | 0.1102 | 0.3720 | 0.0828 | 0.3108 | — | — | — | — |
| 14 | | 0.1283 | 0.3688 | 0.0992 | 0.3141 | — | — | — | — |
| 12 | | 0.1492 | 0.3649 | 0.1170 | 0.3170 | 0.0768 | 0.2667 | — | — |
| 10 | | 0.1738 | 0.3600 | 0.1379 | 0.3198 | 0.0922 | 0.2718 | 0.0888 | 0.2298 |
| 8 | | 0.2006 | 0.3540 | 0.1618 | 0.3219 | 0.1092 | 0.2774 | 0.1033 | 0.2376 |
| 6 | | 0.2278 | 0.3463 | 0.1890 | 0.3234 | 0.1298 | 0.2840 | 0.1248 | 0.2484 |
| 4 | | 0.2552 | 0.3375 | 0.2182 | 0.3240 | 0.1540 | 0.2910 | 0.1480 | 0.2600 |
| 3 | | 0.2697* | 0.3324* | 0.2480 | 0.3232 | 0.1815 | 0.2985 | 0.1760 | 0.2730 |
| 2 | | 0.2840 | 0.3270 | 0.2639* | 0.3222* | 0.2113 | 0.3052 | 0.2065 | 0.2863 |
| 1 | | 0.2976* | 0.3216* | 0.2799 | 0.3208 | 0.2429 | 0.3108 | 0.2384 | 0.2984 |
| | | | | 0.2954* | 0.3188* | 0.2595* | 0.3131* | 0.2559* | 0.3041* |
| | | | | | | 0.2764 | 0.3148 | 0.2740 | 0.3091 |
| | | | | | | 0.2933* | 0.3159* | 0.2922* | 0.3133* |

FIG. 5

| Size | | | | | | | | | |
|---|---|---|---|---|---|---|---|---|---|
| 3/20 | 6.391 | 0.0482 | 0.3695 | — | — | — | — | — | — |
| 18 | | 0.0648 | 0.3682 | 0.0580 | 0.2940 | — | — | — | — |
| 16 | | 0.0843 | 0.3667 | 0.0735 | 0.2979 | — | — | — | — |
| 14 | | 0.1051 | 0.3648 | 0.0940 | 0.3027 | 0.0691 | 0.2559 | — | — |
| 12 | | 0.1288 | 0.3620 | 0.1158 | 0.3071 | 0.0874 | 0.2627 | — | — |
| 10 | | 0.1552 | 0.3580 | 0.1410 | 0.3118 | 0.1086 | 0.2706 | 0.0798 | 0.2151 |
| 8 | | 0.1845 | 0.3531 | 0.1703 | 0.3159 | 0.1326 | 0.2784 | 0.1018 | 0.2281 |
| 6 | | 0.2132 | 0.3468 | 0.2020 | 0.3188 | 0.1620 | 0.2872 | 0.1250 | 0.2411 |
| 4 | | 0.2437 | 0.3386 | 0.2343 | 0.3200 | 0.1928 | 0.2958 | 0.1551 | 0.2571 |
| 3 | | 0.2618* | 0.3330* | 0.2540* | 0.3199* | 0.2272 | 0.3041 | 0.1861 | 0.2722 |
| 2 | | 0.2799 | 0.3271 | 0.2742 | 0.3192 | 0.2482* | 0.3083* | 0.2221 | 0.2886 |
| 1 | | 0.2965* | 0.3214* | 0.2934* | 0.3180* | 0.2699 | 0.3120 | 0.2435* | 0.2971* |
|   | | | | | | 0.2910* | 0.3148* | 0.2660 | 0.3050 |
|   | | | | | | | | 0.2885* | 0.3116* |
| 2/14 | 3.048 | 0.0555 | 0.3588 | — | — | — | — | — | — |
| 12 | | 0.0851 | 0.3576 | 0.0769 | 0.2880 | 0.0724 | 0.2478 | — | — |
| 10 | | 0.1190 | 0.3551 | 0.1050 | 0.2956 | 0.0991 | 0.2582 | 0.0929 | 0.2133 |
| 8 | | 0.1557 | 0.3517 | 0.1405 | 0.3037 | 0.1325 | 0.2710 | 0.1258 | 0.2331 |
| 6 | | 0.1971 | 0.3452 | 0.1843 | 0.3110 | 0.1747 | 0.2853 | 0.1669 | 0.2570 |
| 4 | | 0.2343 | 0.3378 | 0.2234 | 0.3150 | 0.2162 | 0.2981 | 0.2096 | 0.2790 |
| 3 | | 0.2556* | 0.3327* | 0.2465* | 0.3166* | 0.2404* | 0.3043* | 0.2347* | 0.2904* |
| 2 | | 0.2765 | 0.3271 | 0.2697 | 0.3175 | 0.2651 | 0.3098 | 0.2606 | 0.3010 |
| 1 | | 0.2952* | 0.3215* | 0.2915* | 0.3175* | 0.2888* | 0.3140* | 0.2861* | 0.3099* |
| 1/8 | 1.180 | 0.0476 | 0.3458 | — | — | — | — | — | — |
| 6 | | 0.1169 | 0.3452 | 0.1093 | 0.2860 | 0.1059 | 0.2485 | 0.1074 | 0.2129 |
| 4 | | 0.1883 | 0.3406 | 0.1753 | 0.3021 | 0.1702 | 0.2768 | 0.1658 | 0.2496 |
| 3 | | 0.2255* | 0.3353* | 0.2130* | 0.3090* | 0.2064* | 0.2904* | 0.2000* | 0.2694* |
| 2 | | 0.2600 | 0.3289 | 0.2500 | 0.3141 | 0.2430 | 0.3023 | 0.2362 | 0.2882 |
| 1 | | 0.2891* | 0.3223* | 0.2833* | 0.3168* | 0.2782* | 0.3113* | 0.2732* | 0.3043* |

FIG. 6

| V/C | Yc(%) | 2.5 B | | 5.0 B | | 7.5 B | | 10.0 B | |
|---|---|---|---|---|---|---|---|---|---|
| | | x | y | x | y | x | y | x | y |
| 9/ 4 | 76.69 | 0.2680 | 0.3073 | 0.2675 | 0.3005 | 0.2688 | 0.2961 | 0.2712 | 0.2924 |
| 3 | | 0.2799* | 0.3101* | 0.2805* | 0.3058* | 0.2823* | 0.3030* | 0.2841* | 0.3008* |
| 2 | | 0.2909 | 0.3125 | 0.2919 | 0.3102 | 0.2937 | 0.3087 | 0.2949 | 0.3076 |
| 1 | | 0.3010* | 0.3146* | 0.3018* | 0.3137* | 0.3030* | 0.3131* | 0.3036* | 0.3128* |
| 8/12 | 57.62 | 0.1877 | 0.2752 | — | — | — | — | — | — |
| 10 | | 0.2066 | 0.2839 | — | — | — | — | — | — |
| 8 | | 0.2264 | 0.2923 | 0.2237 | 0.2761 | 0.2252 | 0.2668 | 0.2294 | 0.2587 |
| 6 | | 0.2462 | 0.3000 | 0.2457 | 0.2888 | 0.2472 | 0.2821 | 0.2512 | 0.2760 |
| 4 | | 0.2668 | 0.3067 | 0.2671 | 0.2998 | 0.2688 | 0.2956 | 0.2718 | 0.2911 |
| 3 | | 0.2783* | 0.3097* | 0.2791* | 0.3050* | 0.2807* | 0.3020* | 0.2829* | 0.2990* |
| 2 | | 0.2897 | 0.3124 | 0.2908 | 0.3096 | 0.2922 | 0.3077 | 0.2935 | 0.3062 |
| 1 | | 0.3005* | 0.3146* | 0.3014* | 0.3135* | 0.3023* | 0.3126* | 0.3028* | 0.3122* |
| 7/16 | 41.98 | 0.1435 | 0.2472 | — | — | — | — | — | — |
| 14 | | 0.1624 | 0.2581 | 0.1615 | 0.2307 | — | — | — | — |
| 12 | | 0.1797 | 0.2672 | 0.1778 | 0.2430 | 0.1818 | 0.2303 | 0.1883 | 0.2203 |
| 10 | | 0.1994 | 0.2775 | 0.1986 | 0.2579 | 0.2016 | 0.2466 | 0.2078 | 0.2382 |
| 8 | | 0.2208 | 0.2871 | 0.2204 | 0.2729 | 0.2223 | 0.2631 | 0.2277 | 0.2559 |
| 6 | | 0.2418 | 0.2960 | 0.2410 | 0.2854 | 0.2436 | 0.2787 | 0.2478 | 0.2728 |
| 4 | | 0.2629 | 0.3038 | 0.2633 | 0.2972 | 0.2651 | 0.2927 | 0.2685 | 0.2886 |
| 3 | | 0.2747* | 0.3076* | 0.2754* | 0.3027* | 0.2770* | 0.2995* | 0.2797* | 0.2965* |
| 2 | | 0.2867 | 0.3110 | 0.2875 | 0.3078 | 0.2888 | 0.3058 | 0.2908 | 0.3039 |
| 1 | | 0.2986* | 0.3140* | 0.2992* | 0.3124* | 0.3000* | 0.3115* | 0.3011* | 0.3106* |

FIG. 7

| | | | | | | | | | |
|---|---|---|---|---|---|---|---|---|---|
| 6/16 | 29.30 | | | | | | | | |
| 16 | | 0.1294 | 0.2348 | 0.1310 | 0.2048 | 0.1376 | 0.1879 | 0.1454 | 0.1778 |
| 14 | | 0.1480 | 0.2459 | 0.1496 | 0.2193 | 0.1556 | 0.2043 | 0.1629 | 0.1947 |
| 12 | | 0.1660 | 0.2561 | 0.1685 | 0.2339 | 0.1734 | 0.2203 | 0.1803 | 0.2114 |
| 10 | | 0.1879 | 0.2682 | 0.1883 | 0.2487 | 0.1934 | 0.2374 | 0.2000 | 0.2298 |
| 8 | | 0.2080 | 0.2789 | 0.2088 | 0.2635 | 0.2132 | 0.2537 | 0.2189 | 0.2468 |
| 6 | | 0.2312 | 0.2899 | 0.2320 | 0.2789 | 0.2352 | 0.2708 | 0.2399 | 0.2650 |
| 4 | | 0.2571 | 0.3008 | 0.2579 | 0.2938 | 0.2602 | 0.2881 | 0.2637 | 0.2840 |
| 3 | | 0.2703* | 0.3055* | 0.2711* | 0.3004* | 0.2728* | 0.2962* | 0.2755* | 0.2928* |
| 2 | | 0.2835 | 0.3097 | 0.2842 | 0.3063 | 0.2854 | 0.3037 | 0.2871 | 0.3012 |
| 1 | | 0.2968* | 0.3133* | 0.2972* | 0.3116* | 0.2979* | 0.3105* | 0.2987* | 0.3090* |
| 5/18 | 19.27 | | | | | | | | |
| 18 | | — | — | — | — | — | — | 0.1203 | 0.1505 |
| 16 | | 0.1090 | 0.2166 | 0.1132 | 0.1863 | 0.1230 | 0.1711 | 0.1326 | 0.1632 |
| 14 | | 0.1283 | 0.2292 | 0.1320 | 0.2021 | 0.1404 | 0.1878 | 0.1492 | 0.1797 |
| 12 | | 0.1461 | 0.2406 | 0.1505 | 0.2172 | 0.1584 | 0.2042 | 0.1666 | 0.1964 |
| 10 | | 0.1697 | 0.2549 | 0.1729 | 0.2347 | 0.1792 | 0.2230 | 0.1860 | 0.2149 |
| 8 | | 0.1947 | 0.2687 | 0.1958 | 0.2519 | 0.2007 | 0.2417 | 0.2067 | 0.2344 |
| 6 | | 0.2210 | 0.2823 | 0.2215 | 0.2701 | 0.2248 | 0.2612 | 0.2299 | 0.2548 |
| 4 | | 0.2492 | 0.2954 | 0.2493 | 0.2879 | 0.2511 | 0.2808 | 0.2547 | 0.2757 |
| 3 | | 0.2640* | 0.3015* | 0.2642* | 0.2958* | 0.2655* | 0.2906* | 0.2682* | 0.2862* |
| 2 | | 0.2791 | 0.3071 | 0.2794 | 0.3032 | 0.2803 | 0.3000 | 0.2821 | 0.2966 |
| 1 | | 0.2945* | 0.3121* | 0.2948* | 0.3100* | 0.2953* | 0.3087* | 0.2961* | 0.3067* |
| 4/16 | 11.70 | | | | | | | | |
| 16 | | 0.0900 | 0.1973 | — | 0.1785 | — | 0.1655 | 0.1155 | 0.1416 |
| 14 | | 0.1027 | 0.2057 | 0.1098 | 0.1963 | 0.1204 | 0.1837 | 0.1310 | 0.1580 |
| 12 | | 0.1247 | 0.2209 | 0.1299 | 0.2148 | 0.1393 | 0.2028 | 0.1487 | 0.1760 |
| 10 | | 0.1463 | 0.2354 | 0.1512 | 0.2345 | 0.1601 | 0.2232 | 0.1681 | 0.1954 |
| 8 | | 0.1737 | 0.2524 | 0.1759 | 0.2572 | 0.1821 | 0.2470 | 0.1893 | 0.2160 |
| 6 | | 0.2048 | 0.2708 | 0.2060 | 0.2782 | 0.2102 | 0.2704 | 0.2157 | 0.2407 |
| 4 | | 0.2360 | 0.2872 | 0.2363 | 0.2889* | 0.2388 | 0.2827* | 0.2429 | 0.2648 |
| 3 | | 0.2540* | 0.2957* | 0.2538* | 0.2992 | 0.2555* | 0.2947 | 0.2586* | 0.2778* |
| 2 | | 0.2727 | 0.3038 | 0.2723 | 0.3085* | 0.2733 | 0.3061* | 0.2753 | 0.2910 |
| 1 | | 0.2916* | 0.3108* | 0.2912* | — | 0.2916* | — | 0.2926* | 0.3040* |

IMAGE PROCESSING DEVICE METHOD AND PROGRAM

TECHNICAL FIELD

The present invention relates to apparatuses, methods, and programs for processing images, and in particular, to an apparatus, a method, and a program for processing images that can reproduce images in which color tones are preserved even when a luminance signal level is changed by gradation conversion.

BACKGROUND ART

When a change in luminance value of an image is gradual at, for example, an edge part where a change in luminance value should normally be clear, the image creates a fuzzy impression. A clear image can be obtained by enhancing the change in luminance value of such an image. In a television receiver, a digital camera, and the like, a method for sharpening is adopted for improving the clearness of an image.

In this method, an adjustment of color-difference signals is generally performed so as to keep the ratio of luminance signals to color-difference signals that existed before the adjustment. That is to say, levels of luminance signals and color-difference signals are corrected so as to keep the ratio (the Y/C ratio) of luminance signals (Y) to color-difference signals (C) of original colors (so as to keep the Y/C ratio constant). Such an adjustment of color-difference signals is disclosed in, for example, Japanese Unexamined Patent Application Publication No. 11-252584.

However, in correction for keeping the Y/C ratio constant (correction of color-difference signals), when levels of luminance signals (Y levels) are decreased by gradation conversion, an image appears dark in some practical cases. Moreover, when levels of color-difference signals (C levels) are large, levels of luminance signals (Y levels) are small, and the levels of luminance signals (the Y levels) are increased by gradation conversion, the levels of color-difference signals (C levels) are also increased to keep the Y/C ratio constant. Thus, the levels of color-difference signals (C levels) disadvantageously reach a saturation point.

DISCLOSURE OF INVENTION

The present invention is conceived in light of the situation described above to prevent a color from appearing dark and saturation of the color even when the luminance signal level is changed by gradation conversion.

A first image-processing apparatus according to the present invention includes gradation-correction means for generating a corrected value by correcting gradation of a value of a first element out of first to third elements according to a first color system, the value of the first element being defined by input image signals; first calculating means for calculating values of fourth to sixth elements according to a second color system, based on values of the first to third elements according to the first color system, the values of the first to third elements being defined by the input image signals; second calculating means for calculating values defined by seventh and ninth elements according to a third color system represented by the seventh to ninth elements, based on the values of the fourth to sixth elements calculated by the first calculating means; and third calculating means for calculating values of the fourth to sixth elements according to the second color system, based on the value of the fourth element according to the second color system and the values that are calculated by the second calculating means and defined by the seventh and ninth elements according to the third color system.

The first element according to the first color system may be an element related to luminance or value.

The seventh and ninth elements according to the third color system may be elements related to hue and chroma, respectively.

The second color system may be the XYZ color system, and the third color system may be the Munsell color system.

The first color system may be the YCrCb color system.

The image-processing apparatus may further include fourth calculating means for calculating the first to third elements according to the first color system, based on individual elements according to a color system of the image signals.

A first image-processing method according to the present invention includes a gradation-correction step of generating a corrected value by correcting gradation of a value of a first element out of first to third elements according to a first color system, the value of the first element being defined by input image signals; a first calculating step of calculating values of fourth to sixth elements according to a second color system, based on values of the first to third elements according to the first color system, the values of the first to third elements being defined by the input image signals; a second calculating step of calculating values defined by seventh and ninth elements according to a third color system represented by the seventh to ninth elements, based on the values of the fourth to sixth elements calculated in the first calculating step; and a third calculating step of calculating values of the fourth to sixth elements according to the second color system, based on the value of the fourth element according to the second color system and the values that are calculated in the second calculating step and defined by the seventh and ninth elements according to the third color system.

A first computer-executable program according to the present invention performs an image-processing method. The image-processing method includes a gradation-correction step of generating a corrected value by correcting gradation of a value of a first element out of first to third elements according to a first color system, the value of the first element being defined by input image signals; a first calculating step of calculating values of fourth to sixth elements according to a second color system, based on values of the first to third elements according to the first color system, the values of the first to third elements being defined by the input image signals; a second calculating step of calculating values defined by seventh and ninth elements according to a third color system represented by the seventh to ninth elements, based on the values of the fourth to sixth elements calculated in the first calculating step; and a third calculating step of calculating values of the fourth to sixth elements according to the second color system, based on the value of the fourth element according to the second color system and the values that are calculated in the third calculating step and defined by the seventh and ninth elements according to the third color system.

A second image-processing apparatus according to the present invention includes first calculating means for calculating values of fourth to sixth elements according to a second color system, based on values of first to third elements according to a first color system, the values of the first to third elements being defined by input image signals; second calculating means for calculating a value of an eighth element according to a third color system represented by seventh to ninth elements and values defined by the seventh and ninth elements, based on the values of the fourth to sixth elements calculated by the first calculating means; gradation-correction means for generating a corrected value by correcting gradation of the value of the eighth element calculated by the second calculating means; third calculating means for calculating a value of the fifth element according to the second color system from the corrected value generated by the gradation-correction means; and fourth calculating means for calculating the fourth to sixth elements according to the second color system, based on the value of the fifth element according to the second color system calculated by the third calculating means and the values that are calculated by the second calculating means and defined by the seventh and ninth elements.

The eighth element according to the third color system may be an element related to value.

The seventh and ninth elements according to the third color system may be elements related to hue and chroma, respectively.

The second color system may be the XYZ color system, and the third color system may be the Munsell color system.

The first color system may be the RGB color system.

A second image-processing method according to the present invention includes a first calculating step of calculating values of fourth to sixth elements according to a second color system, based on values of first to third elements according to a first color system, the values of the first to third elements being defined by the input image signals; a second calculating step of calculating a value of an eighth element according to a third color system represented by seventh to ninth elements and values defined by the seventh and ninth elements, based on the values of the fourth to sixth elements calculated in the first calculating step; a gradation-correction step of generating a corrected value by correcting gradation of the value of the eighth element calculated in the second calculating step; a third calculating step of calculating a value of the fifth element according to the second color system from the corrected value generated in the gradation-correction step; and a fourth calculating step of calculating the fourth to sixth elements according to the second color system, based on the value of the fifth element according to the second color system calculated in the third calculating step and the values that are calculated in the second calculating step and defined by the seventh and ninth elements.

A second computer-executable program according to the present invention performs an image-processing method. The image-processing method includes a first calculating step of calculating values of fourth to sixth elements according to a second color system, based on values of first to third elements according to a first color system, the values of the first to third elements being defined by input image signals; a second calculating step of calculating a value of an eighth element according to a third color system represented by seventh to ninth elements and values defined by the seventh and ninth elements, based on the values of the fourth to sixth elements calculated in the first calculating step; a gradation-correction step of generating a corrected value by correcting gradation of the value of the eighth element calculated in the second calculating step; a third calculating step of calculating a value of the fifth element according to the second color system from the corrected value generated in the gradation-correction step; and a fourth calculating step of calculating the fourth to sixth elements according to the second color system, based on the value of the fifth element according to the second color system calculated in the third calculating step and the values that are calculated in the second calculating step and defined by the seventh and ninth elements.

In the first invention, a corrected value is generated by correcting gradation of a value of a first element out of first to third elements according to a first color system, the value of the first element being defined by input image signals. Values of fourth to sixth elements according to a second color system are calculated, based on values of the first to third elements according to the first color system, the values of the first to third elements being defined by the input image signals. Values defined by seventh and ninth elements according to a third color system represented by the seventh to ninth elements are calculated, based on the calculated values of the fourth to sixth elements. Values of the fourth to sixth elements according to the second color system are calculated, based on the value of the fourth element according to the second color system and the values defined by the seventh and ninth elements according to the third color system.

In the second invention, values of fourth to sixth elements according to a second color system are calculated, based on values of first to third elements according to a first color system, the values of the first to third elements being defined by input image signals. A value of an eighth element according to a third color system represented by seventh to ninth elements and values defined by the seventh and ninth elements are calculated, based on the calculated values of the fourth to sixth elements. Gradation of the calculated value of the eighth element is corrected. A value of the fifth element according to the second color system is calculated from the generated corrected value. The fourth to sixth elements according to the second color system are calculated, based on the calculated value of the fifth element according to the second color system and the values defined by the seventh and ninth elements.

BRIEF DESCRIPTION OF THE DRAWINGS

FIG. 4 is a view illustrating the structure of a conversion table.

FIG. 5 is a view illustrating the structure of a conversion table.

FIG. 6 is a view illustrating the structure of a conversion table.

FIG. 7 is a view illustrating the structure of a conversion table.

BEST MODE FOR CARRYING OUT THE INVENTION

Figure 1:
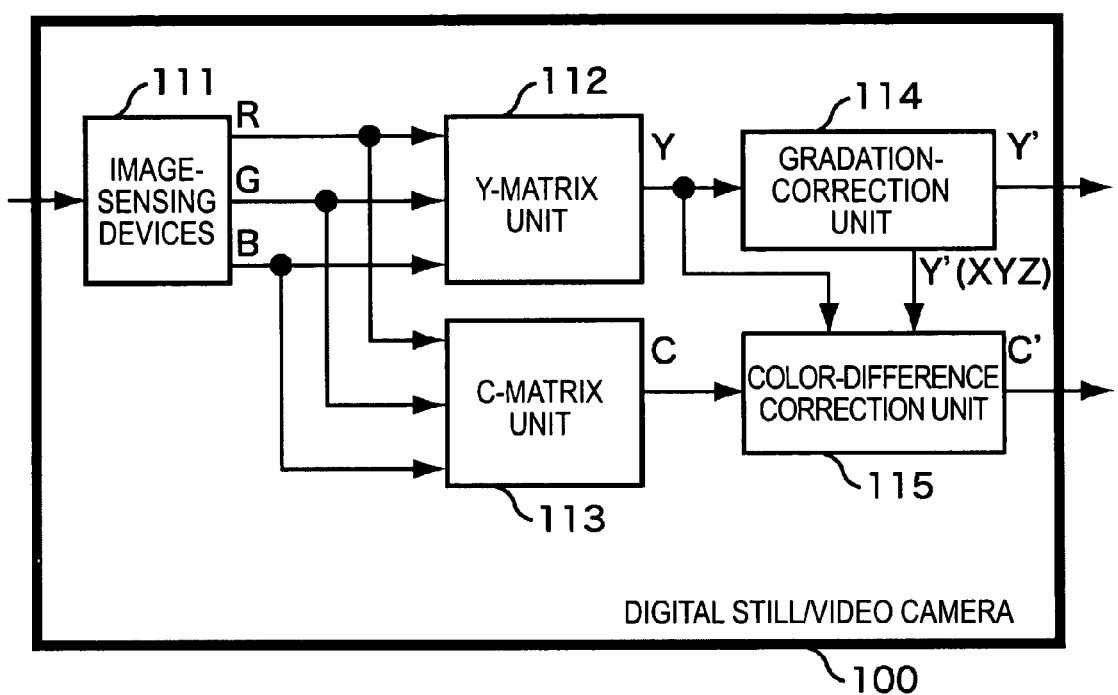
FIG. 1 is a block diagram illustrating the structure of a main part of a typical digital still/video camera to which the present invention is applied.

FIG. 1 is a view illustrating the structure of a main part of a typical video camera, for example, a digital still/video camera 100, to which the present invention is applied.

Image-sensing devices 111 are composed of, for example, charge coupled devices (CCDs) and complementary metal-oxide semiconductor (CMOS) devices. The image-sensing devices 111 capture an optical image from a subject as image signals and generate three-primary-color signals of R, G, and B from these image signals. A Y-matrix unit 112 performs matrix calculation on these R, G, and B signals to calculate the Y signals (the luminance components). A C-matrix unit 113 performs matrix calculation on the three-element signals of R, G, and B to calculate the C signals (the color-difference components). These C signals (the color-difference components) are composed of Cr and Cb color-difference signals.

The Y signals (the luminance components) calculated by the Y-matrix unit 112 are input to a gradation-correction unit 114 and a color-difference correction unit 115. The gradation-correction unit 114 performs gradation correction on the input Y signals (the luminance components) and outputs the results as gradation-corrected signals Y' to a processing unit in the subsequent stage, which is not shown. The gradation-correction unit 114 also outputs the gradation-corrected signals Y' to the color-difference correction unit 115 as elements Y' of the XYZ color system.

The C signals (the color-difference components) calculated by the C-matrix unit 113 are input to the color-difference correction unit 115. The color-difference correction unit 115 performs color-difference correction, based on the Y signals (the luminance components) sent from the Y-matrix unit 112, the signals Y', (the gradation-corrected signals according to the XYZ color system) sent from the gradation-correction unit 114, and the C signals (the color-difference components) sent from the C-matrix unit 113. Then, the color-difference correction unit 115 outputs the results as color-difference corrected results C' to the processing unit in the subsequent stage, which is not shown. At this time, the color-difference correction is performed so as to preserve the hue (H) and the chroma (C) according to the Munsell color system.

The Munsell color system will now be described.

In the Munsell color system, a person compares colors of objects with color chips to represent colors, using the color chips classified with numbers or symbols, based on the hue (H: Hue), the value (V: Value), and the chroma (C: Chroma), which are three color attributes (elements). In Japan, the Munsell color system is stipulated as "Sanzokusei niyoru Iro no Hyouji Houhou (Colour specification—Specification according to their three attributes)" in the JIS (JIS Z 8721).

Figure 2:
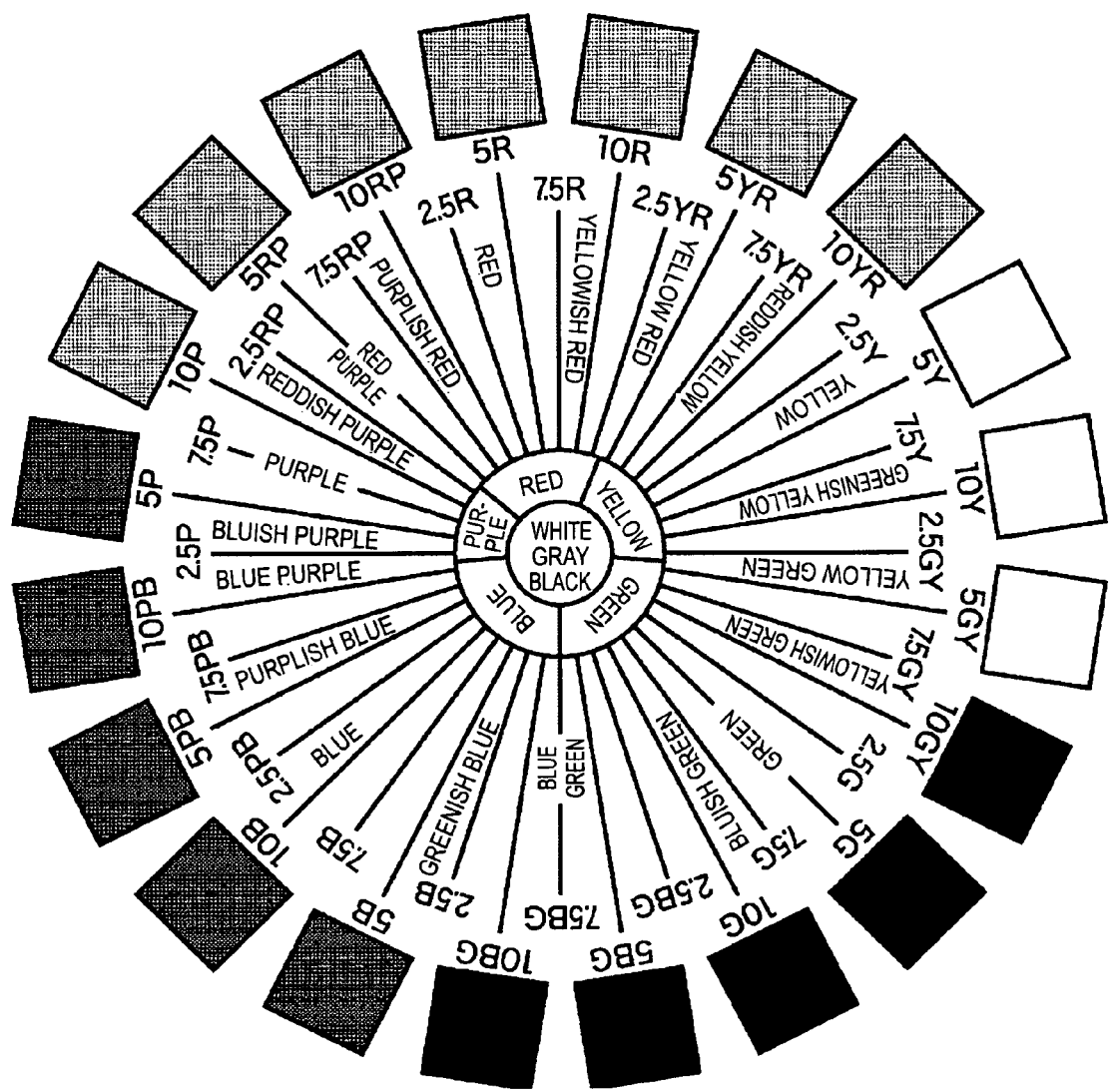
FIG. 2 a view illustrating the Munsell hue circle.

In the Munsell color system, for example, when the color of an apple is described, a person searches colors represented by the Munsell hue circle shown in FIG. 2 for a color closest to the color of the apple and sets the value of the closest color as that of the apple. The Munsell hue circle in FIG. 2 shows ten colors that are practically used (5Y (Yellow), 5YR (Yellow-Red), 5R (Red), 5RP (RedPurple), 5P (Purple), 5PB (Purple-Blue), 5B (Blue), 5BG (BlueGreen), 5G (Green), and 5GY (GreenYellow), each of the ten colors being divided into two (that is to say, twenty colors additionally including 10Y, 10YR, 10R, 10RP, 10P, 10PB, 10B, 10BG, 10G, and 10GY). For example, when the color of the apple is represented by 2.5R occupying the intermediate position between 10RP and 5R, a color having a value (V) and a chroma (C) that are closest to those of the color of the apple in Munsell color chips (not shown) indicating values and chromas for 2.5R is set as the color of the apple.

For example, when the color of an apple is closest to a color having a value (V)=4 and a chroma (C)=12 in Munsell color chips (not shown), the color of this apple is represented by "2.5R 4/12". Since the Munsell color system is expressed in three dimensions (since the system is expressed with three axes of hue, chroma, and value), values can be assigned to colors, as described above.

Figure 3:
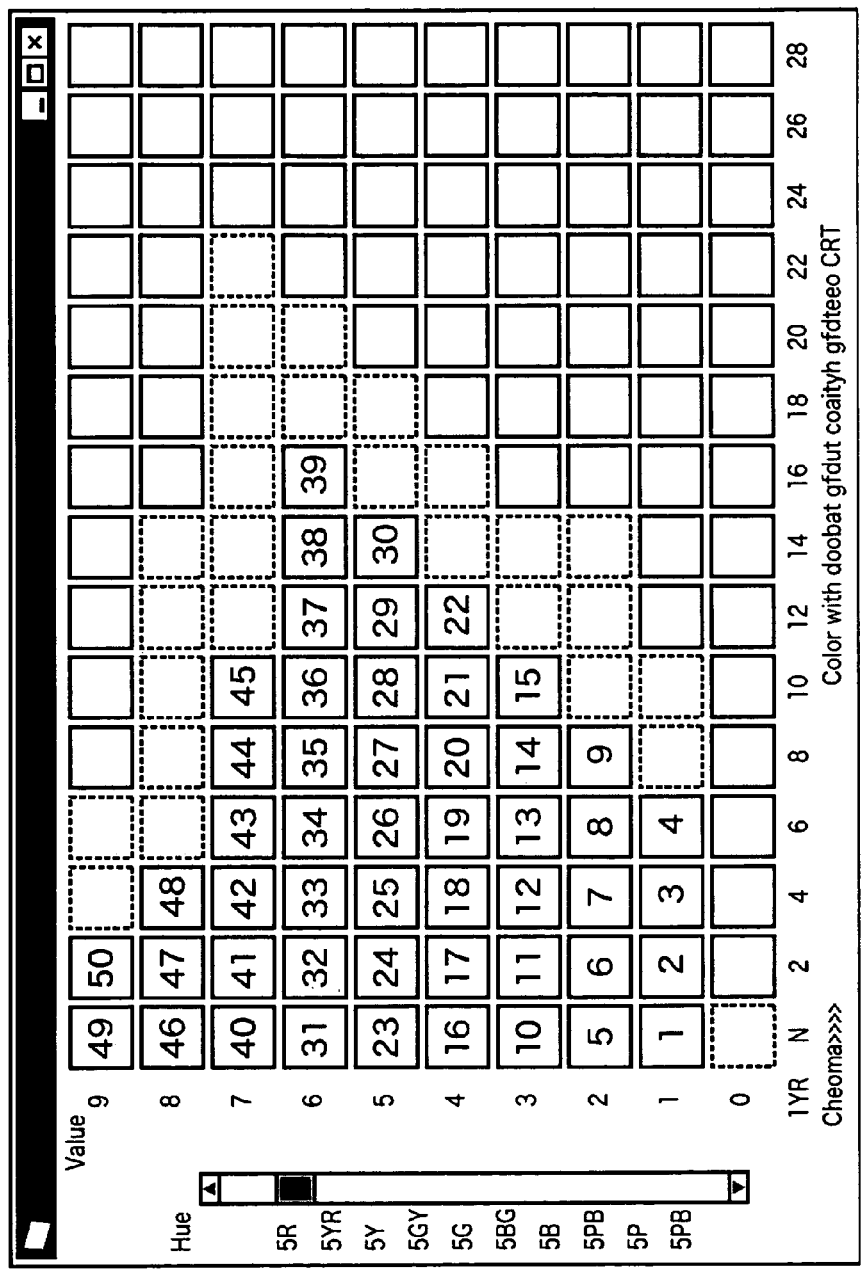
FIG. 3 is a view illustrating Munsell color chips when the Munsell hue circle is 1YR.

FIG. 3 is a view illustrating Munsell color chips indicating values (V)/chromas (C) when a Munsell hue is 1YR.

In an example in FIG. 3, the hue is fixed at 1YR, the abscissa indicates chroma (C), and the ordinate indicates value (V). The color becomes more intense as the chroma (C) becomes larger and becomes brighter as the value (V) becomes larger. Chroma (C)=N indicates an achromatic color.

There are various types of color systems (color spaces), and colors according to one color system (color space) can be converted to those according to the other color system (color space). For example, colors according to the Munsell color system can be converted to those according to the XYZ color system using conversion tables stipulated in JIS Z 8721, as shown in FIGS. 4 to 7. Colors according to the XYZ color system can be converted to those according to the RGB color system using matrices stipulated in JIS X 9204.

For example, when signals to be handled are those used in a digital still/video camera, a transformation matrix for converting a color according to the RGB color system to that according to the XYZ color system is represented by equation (1):

$$\begin{bmatrix} X \\ Y \\ Z \end{bmatrix} = \begin{bmatrix} 0.607 & 0.174 & 0.200 \\ 0.299 & 0.587 & 0.114 \\ 0.000 & 0.066 & 1.116 \end{bmatrix} \times \begin{bmatrix} R \\ G \\ B \end{bmatrix} \quad (1)$$

Conversely, a matrix for converting a color according to the XYZ color system to that according to the RGB color system is represented by equation (2):

$$\begin{bmatrix} R \\ G \\ B \end{bmatrix} = \begin{bmatrix} 1.9104 & -0.5338 & -0.2891 \\ -0.9844 & 1.9985 & -0.0279 \\ 0.0585 & -0.1187 & 0.9017 \end{bmatrix} \times \begin{bmatrix} X \\ Y \\ Z \end{bmatrix} \quad (2)$$

A color according to the RGB color system can be converted to a color according to the YCrCb color system (a color in a color space used in digital still/video cameras), based on equations (3), (4), and (5):

$$Y = 0.30R + 0.59G + 0.11B \quad (3)$$

$$Cr = R - Y \quad (4)$$

$$Cb = B - Y \quad (5)$$

Color-difference signals Cr and Cb are respectively represented by equations (4) and (5) as elements in the YCrCb color system. A value corresponding to chroma C in the Munsell color system can be calculated by substituting the color-difference signals Cr and Cb into equation (6):

$$C = \sqrt{Cr^2 + Cb^2} \quad (6)$$

Figure 8:
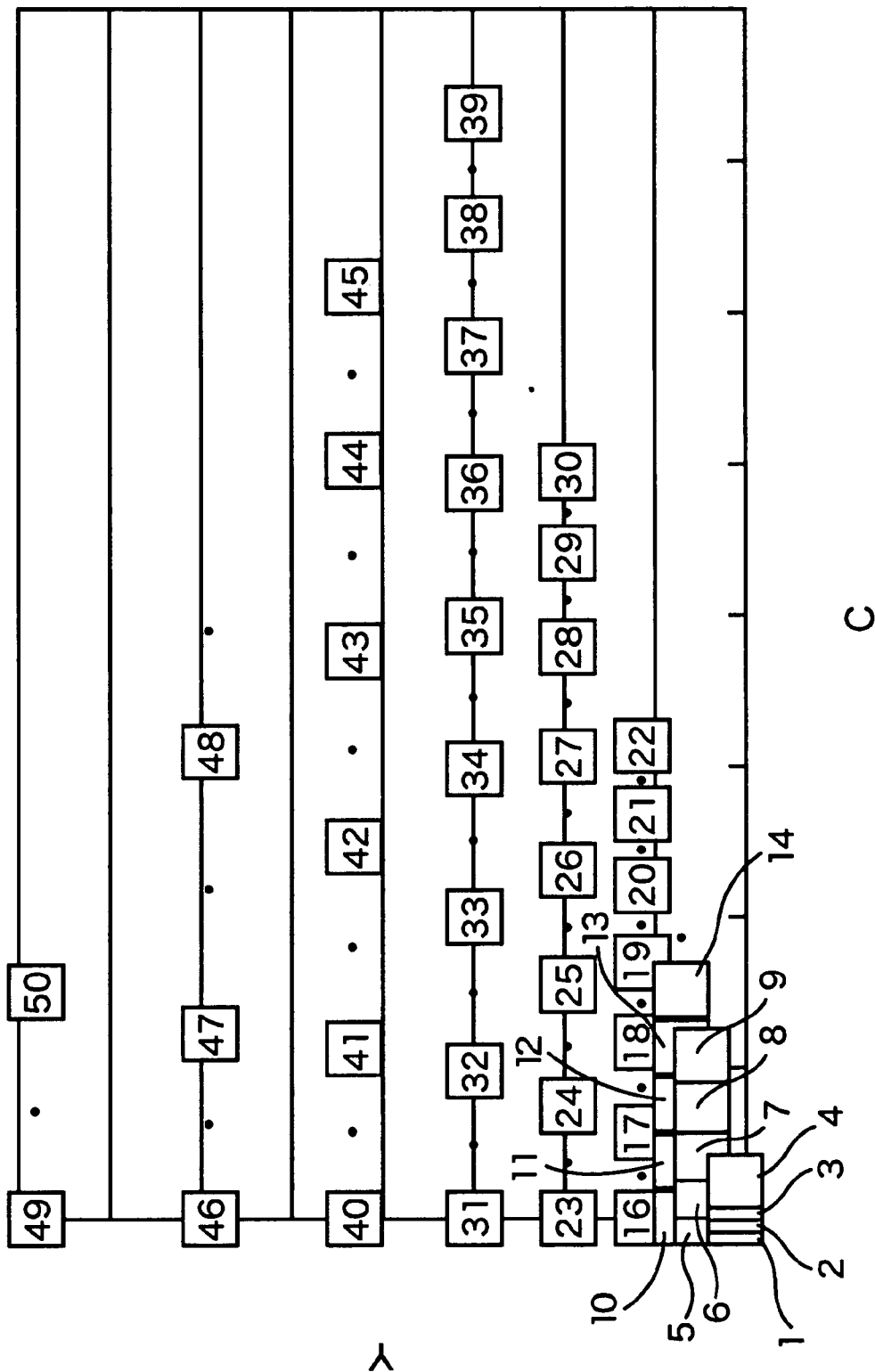
FIG. 8 is a view illustrating YCrCb values converted from the Munsell color chips in FIG. 3.

YC coordinates in the YCrCb color system that are converted from values of the Munsell color chips in FIG. 3 are shown in FIG. 8. In FIG. 8, the abscissa indicates values of color-difference signals calculated based on equation (6), and the ordinate indicates Y (luminance component). Numbers assigned to individual blocks shown in FIG. 8 correspond to those shown in FIG. 3.

A gradation-adjusting process (D range compression) in the digital still/video camera 100 in FIG. 1 will now be described with reference to a flowchart in FIG. 9. In this process, the gradation-adjusting process is performed on a signal Y (a luminance component) according to the YCrCb color system. This process is started in response to a command for shooting images from a user.

In step S1, the image-sensing devices 111 in the digital still/video camera 100 capture RGB signals (an original color). Specifically, the image-sensing devices 111 capture an optical image from a subject as image signals and obtain (generate) RGB signals from these image signals.

In step S2, the Y-matrix unit 112 and the C-matrix unit 113 convert the obtained RGB signals to YCrCb signals. Specifically, the RGB signals are converted to the YCrCb signals, based on equations (3) to (5). The Y-matrix unit 112 generates the Y signal, and the C-matrix unit 113 generates the Cr and Cb signals, i.e., the C signals.

In step S3, the gradation-correction unit 114 obtains the luminance signal Y from the Y-matrix unit 112 and performs the gradation adjustment on the luminance signal Y. That is to say, various types of filtering processes, for example, an unsharp mask, are performed on the luminance signal to improve the sharpness of the image. Since a Y value according to the XYZ color system is the same as that according to the YCrCb color system, the Y' value at this time is a signal Y', which is a Y signal according to the XYZ color system.

In step S4, the gradation-correction unit 114 outputs the signal Y' (the Y signal according to the XYZ color system), which is the result from the gradation adjustment in step S3, to the color-difference correction unit 115.

In step S5, the color-difference correction unit 115 performs a calculation to convert the YCrCb signals, which have the original color (the color before the gradation adjustment) and are generated by the Y-matrix unit 112 and the C-matrix unit 113 in the process in step S2, to signals according to the XYZ color system according to equation (7):

$$\begin{bmatrix} X \\ Y \\ Z \end{bmatrix} = \begin{bmatrix} 1.1431 & 0.5137 & 0.3175 \\ 1 & 0 & 0 \\ 1.1770 & -0.0336 & 1.0982 \end{bmatrix} \times \begin{bmatrix} Y \\ Cr \\ Cb \end{bmatrix} \quad (7)$$

In step S6, the color-difference correction unit 115 calculates values h1 and h2 according to the Munsell color system. The detailed relationship between the XYZ color system and the hue (H), the chroma (C), and the value (V) according to the Munsell color system is represented by the following equations (8) to (23). The values h1 and h2 are respectively defined by equations (10) and (11). These equations are shown in, for example, the publication Makoto Miyahara, *Keitouteki Gazou fugouka* (*Systematic image coding*) (IPC, Inc., Jul. 31, 1990), pp. 147-49:

$$Xc = 1.020X \quad (8)$$

$$Zc = 0.847Z \quad (9)$$

$$h1 = F(Xc) - F(Y) \quad (10)$$

$$h2 = F(Zc) - F(Y) \quad (11)$$

$$h3 = F(Y) \quad (12)$$

Here, a function F(A) is defined by the following equations (13) and (14) where A is Xc, Y, or Zc:

$$F(A) = 11.6A^{1/3} - 1.6 \quad (13)$$

$$A = Xc, Y, Zc \quad (14)$$

Coordinate axes S1 and S2 and values M1 to M3 are represented by equations (15) to (19). θ satisfies equation (20):

$$M1 = h1 \quad (15)$$

$$M2 = 0.4 \times h2 \quad (16)$$

$$M3 = 0.23h3 \quad (17)$$

$$S1 = (8.88 + 0.966 \cos(\theta)) \times M1 \quad (18)$$

$$S2 = (8.025 + 2.558 \sin(\theta)) \times M2 \quad (19)$$

$$\theta = \tan^{-1}(M2/M1) \quad (20)$$

H, C, and V according to the Munsell color system are defined by equations (21) to (23) on the coordinate axes S1 and S2:

$$H = \tan^{-1}(S2/S1) \quad (21)$$

$$C = (S1^2/S2^2)^{-1/2} \quad (22)$$

$$V = M3 \quad (23)$$

When the values h1 and h2 obtained by equations (10) and (11) described above, respectively, are determined, the hue (H) and the chroma (C) are uniquely determined. This is apparent as described below: The hue (H) and the chroma (C) are defined by S1 and S2 as shown by equations (21) and (22), S1 and S2 are defined by θ, M1, and M2 as shown by equations (18) and (19), θ is defined by M1 and M2 as shown by equation (20), and M1 and M2 are defined by h1 and h2 as shown by equations (15) and (16). Here, the values h1 and h2 themselves are not equal to the hue (H) and the chroma (C).

Here, according to the Munsell color system, it is assumed that the original color (the color before the gradation conversion) is indicated by HVC (hue, value, and chroma), and a color after the gradation conversion is indicated by H'V'C'. In this embodiment, the color-difference signals are converted so as to preserve the hue H and the chroma C. That is to say, the color-difference signals are converted so that H'=H and C'=C.

To achieve a gradation conversion in which the hue H and the chroma C are preserved, the color after the gradation conversion needs to be that in which only the value V is changed and the hue H and the chroma C are not changed. However, transformation equations for reciprocal color-conversion attaining a sufficient accuracy from a practical standpoint have not been found between the Munsell color system and the other color systems (color systems other than the XYZ color system), for example, the RGB, YUV, YPbPr, and YCrCb color systems, that are used in many image-processing apparatuses, for example, a video camera and a television receiver. Thus, as described above, the transformation equations (8) to (23) between the Munsell color system and the XYZ color system are used.

Accordingly, in this embodiment, HV'C (a color according to the Munsell color system, in which only V out of the original HVC according to the Munsell color system is replaced with V') after the gradation conversion are converted to values (hereinafter, described as X'Y'Z') according to the XYZ color system in order to achieve a color in which the hue and the chroma are preserved and only the value is different.

In step S7, the color-difference correction unit 115 calculates X' and Z' according to the XYZ color system (Y' is already obtained in the process in steps S3 and S4), based on the value Y according to the YCrCb color system, on which the gradation adjustment was performed by the gradation-correction unit 114 in the process in step S3, i.e., the value Y', which is a Y signal according to the XYZ color system after the gradation adjustment, and based on the values h1 and h2 calculated by the color-difference correction unit 115 in the process in step S6.

Specifically, X'Y'Z' are derived using the following equations (24) to (29). Equation (24) is derived from equation (13):

$$A = ((F(A)+1.6)/11.6)^3 \qquad (24)$$

Then, F(Xc') is obtained from equation (10), and XX in equation (25) is defined:

$$F(Xc') = h1 + F(Y') = XX \qquad (25)$$

The value h1 in equation (25) is obtained in the process in step S6. The value of F(Y') is obtained by substituting Y' (the value of Y' is already obtained in the process in step S3) for A in equation (13). Thus, XX can be obtained from equation (25).

Equation (26) is obtained by substituting Xc' for A in equation (24) and then applying equation (25). Then, Xc' is calculated by substituting XX in equation (25) into equation (26):

$$Xc' = ((XX+1.6)/11.6)^3 \qquad (26)$$

Then, equation (27) is obtained based on equation (8), and X' can be obtained by substituting Xc' obtained in equation (26) into equation (27):

$$X' = Xc'/1.020 \qquad (27)$$

Z' is calculated by a similar calculation as X'. Equation (24) is first derived from equation (13). Then, F(Zc') is then obtained based on equation (11), and YY in equation (28) is defined:

$$F(Zc') = h2 + F(Y') = YY \qquad (28)$$

Here, the value h2 in equation (28) is obtained in the process in step S6. The value of F(Y') is obtained by substituting Y' (the value of Y' is already obtained in the process in step S3) for A in equation (13). Thus, YY can be obtained from equation (28).

Equation (29) is obtained by substituting Zc' for A in equation (24) and then applying equation (28), and Zc' is calculated:

$$Zc' = ((YY+1.6)/11.6)^3 \qquad (29)$$

Then, equation (30) is obtained based on equation (9), and Z' can be obtained by substituting Zc' obtained in equation (29) into equation (30):

$$Z' = Zc'/0.847 \qquad (30)$$

In the process described above, the color after the gradation adjustment according to the Munsell color system, in which the hue H and the chroma C are not changed and only the value V is changed, is expressed according to the XYZ color system, i.e., a color X'Y'Z' is obtained.

After the process in step S7, in step S8, the color-difference correction unit 115 calculates a color in the color space of the original color from X'Y'Z' after the gradation conversion (X' and Z' are the values calculated by the color-difference correction unit 115 in step S7, and Y' is the value generated by the gradation-correction unit 114 in step S3). Specifically, the color-difference correction unit 115 substitutes X'Y'Z' for XYZ in equation (2), substitutes the obtained RGB values into equation (3) to generate a signal Y, substitutes the signals Y and R into equation (4) to generate Cr, and substitutes the signals Y and B into equation (5) to generate Cb.

In step S9, the gradation-correction unit 114 and the color-difference correction unit 115 output the respective calculation results to the processing unit in the subsequent stage as the results of the gradation adjustment (output as the color space of the original color), and the process is completed. In this case, YCrCb signals are output. In these output YCrCb signals, the hue (H) and the chroma (C) are preserved.

In the case described above, the values h1 and h2 are calculated in step S6. Alternatively, the hue H and the chroma C themselves may be calculated. However, the calculation of the values h1 and h2 is simpler than that of the hue H and the chroma C.

Figure 9:
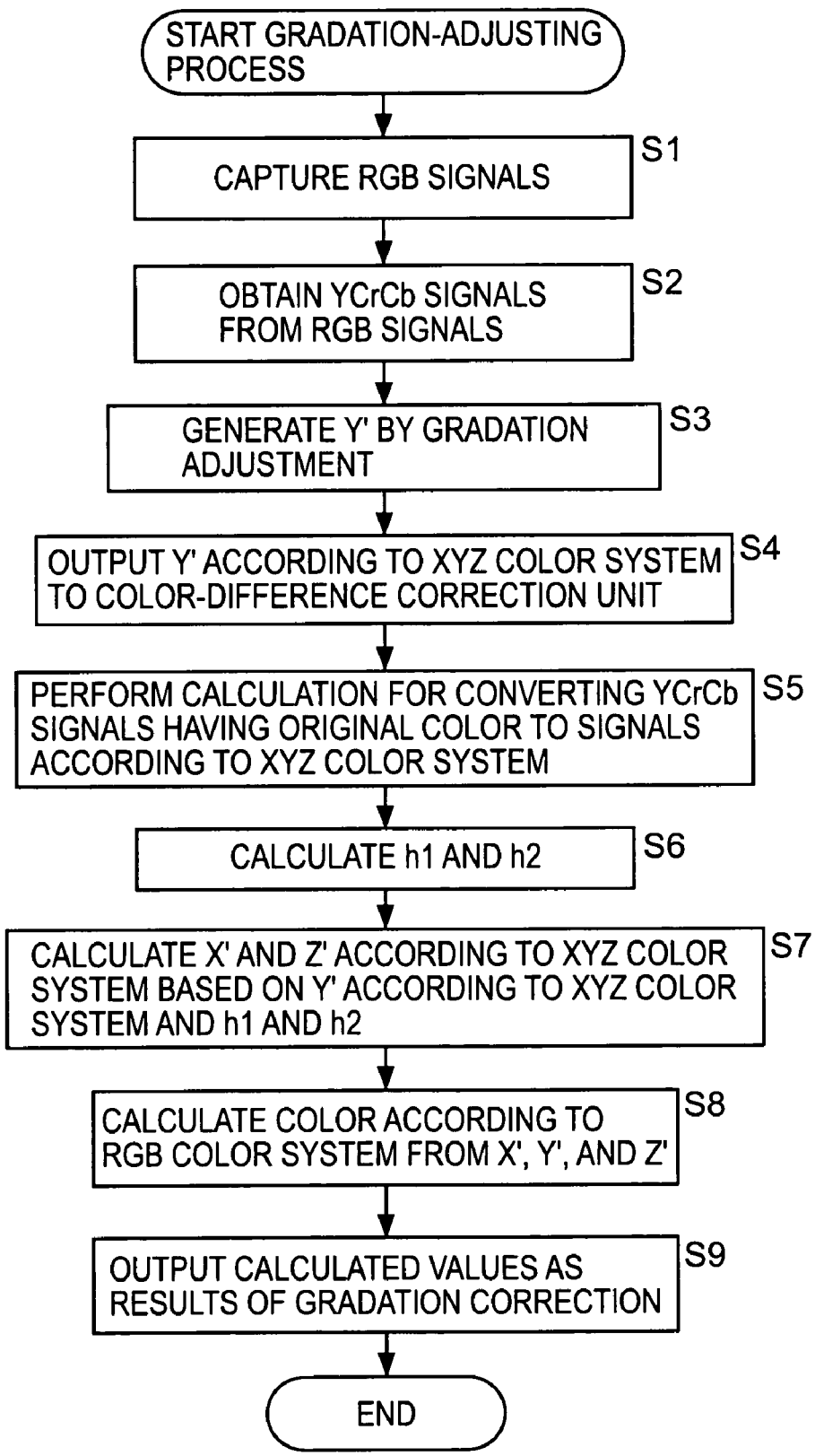
FIG. 9 is a flowchart illustrating a gradation-adjusting process in the digital still/video camera in FIG. 1.
Figure 10:
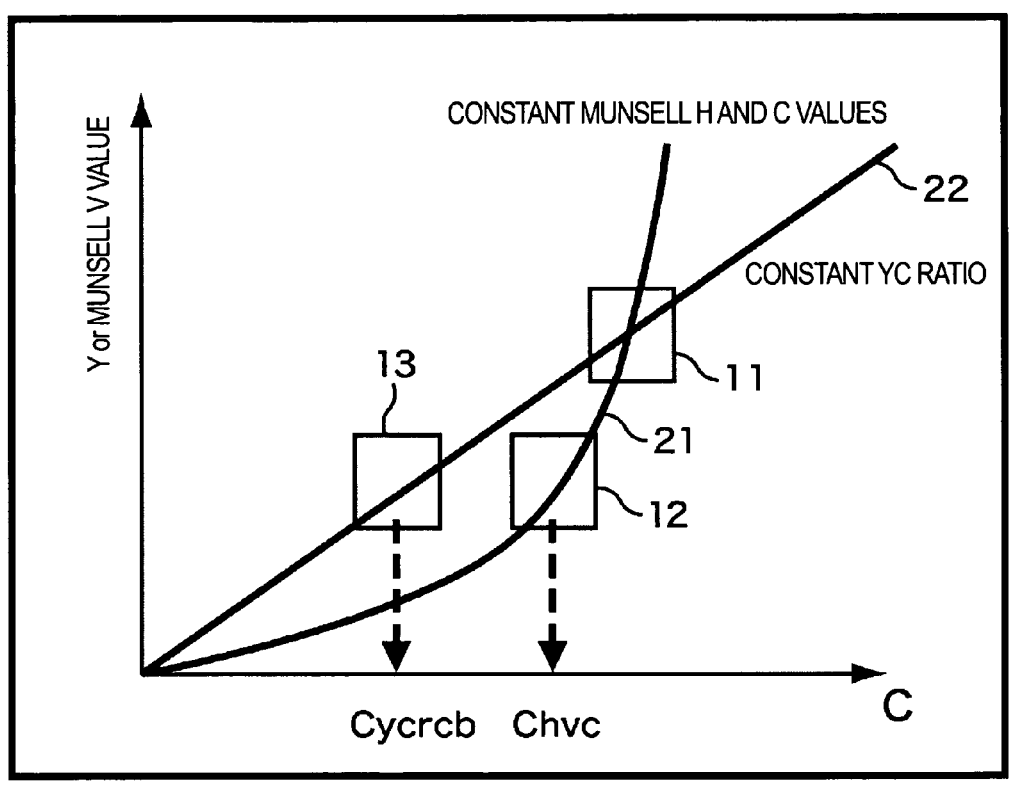
FIG. 10 is a view illustrating corrected values in a case where luminance is decreased by gradation conversion.
Figure 11:
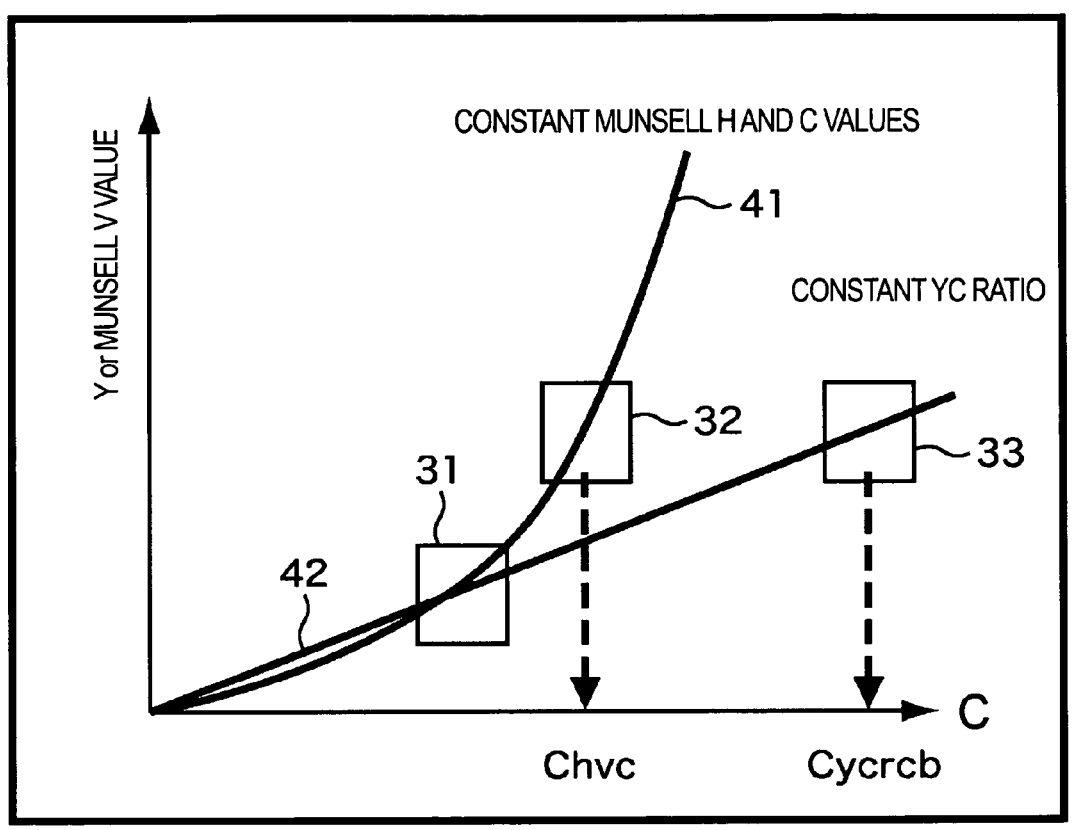
FIG. 11 is a view illustrating corrected values in a case where luminance is increased by gradation conversion.

FIGS. 10 and 11 illustrate the results of performing the gradation-adjusting process, shown in FIG. 9, on the signal Y (the luminance component) according to the YCrCb color system. FIG. 10 illustrates a case where the luminance is decreased by the gradation adjustment for a certain block out of the blocks shown in FIG. 8 (the blocks to which the numbers are assigned).

In FIG. 10, the abscissa indicates C (chroma, which is the value of color-difference signals calculated based on equation (6) described above), and the ordinate indicates Y (luminance component according to the YCrCb color system) or the Munsell V value (value according to the Munsell color system). In the drawing, Cycrcb indicates a corrected value in a case where the gradation-adjusting process is performed so as to keep the Y/C ratio constant (hereinafter, this correction technique is called a "constant-YC-ratio" technique), and Chvc indicates a corrected value in a case where the gradation-adjusting process is performed so that the hue (H) and chroma (C) of the original color are preserved and only the value is changed (hereinafter, this correction technique is called a "constant-Munsell-HC" technique for keeping the Munsell hue and chroma constant).

As shown in FIG. 10, when the Y/C ratio is constant, the block indicating the color moves along a straight line 22. For example, when the luminance of the color of a block 11 is decreased so as to keep the Y/C ratio constant, the block 11 moves along the straight line 22 to the position of a block 13.

On the other hand, when the Munsell H and C values are constant, the block indicating the color moves along a curved line 21 that has a shape convex toward the right of the drawing (that has positive differential characteristics). For example, when the luminance of the color of the block 11 is decreased to the luminance level of the block 13 so as to keep the Munsell H and C values constant, the block 11 moves along the curved line 21 to the position of a block 12. As shown in FIG. 10, when the luminance value (Y or the Munsell V value) is decreased by the gradation adjustment, chromas (the chroma Cycrcb of the block 13 and the chroma Chvc of the block 12) at the same luminance take values so that Cycrcb<Chvc. That is to say, when the luminance signal level is decreased by the gradation adjustment, the chroma Chvc, which is the corrected value in the case where the Munsell H and C values are constant, is larger than the chroma Cycrcb, which is the corrected value in the case where the Y/C ratio is constant. Thus, the chroma (C) can be prevented from being decreased more than necessary, and the color can be prevented from appearing dark.

Corresponding to FIG. 10, FIG. 11 illustrates a case where the luminance is increased by the gradation adjustment for a certain block out of the blocks shown in FIG. 8 (the blocks to which the numbers are assigned).

In FIG. 11, the abscissa indicates C (chroma, which is the value of color-difference signals calculated based on equation (6) described above), and the ordinate indicates Y (luminance component according to the YCrCb color system) or the Munsell V value (value according to the Munsell color system). In the drawing, Cycrcb indicates a corrected value in a case where the process is performed so as to keep the Y/C ratio constant, and Chvc indicates a corrected value in a case where the process is performed so as to keep the Munsell H and C values constant.

As shown in FIG. 11, when the Y/C ratio is constant, the block indicating the color moves along a straight line 42. For example, when the luminance of the color of a block 31 is increased so as to keep the Y/C ratio constant, the block 31 moves along the straight line 42 to the position of a block 33. On the other hand, when the Munsell H and C values are constant, the block indicating the color moves along a curved line 41 that has a shape convex toward the right of the drawing (that has positive differential characteristics). For example, when the luminance of the color of the block 31 is increased to the luminance level of the block 33 so as to keep the Munsell H and C values constant, the block 31 moves along the curved line 41 to the position of a block 32.

As shown in FIG. 11, when the luminance value (Y or the Munsell V value) is increased by the gradation adjustment, chromas (the chroma Cycrcb of the block 33 and the chroma Chvc of the block 32) at the same luminance take values so that Cycrcb>Chvc. That is to say, when the luminance signal level is increased by the gradation adjustment, the chroma Chvc, which is the corrected value in the case where the Munsell H and C values are constant, is smaller than the chroma Cycrcb, which is the corrected value in the case where the Y/C ratio is constant. Thus, saturation of the chroma C can be prevented.

Figure 12:
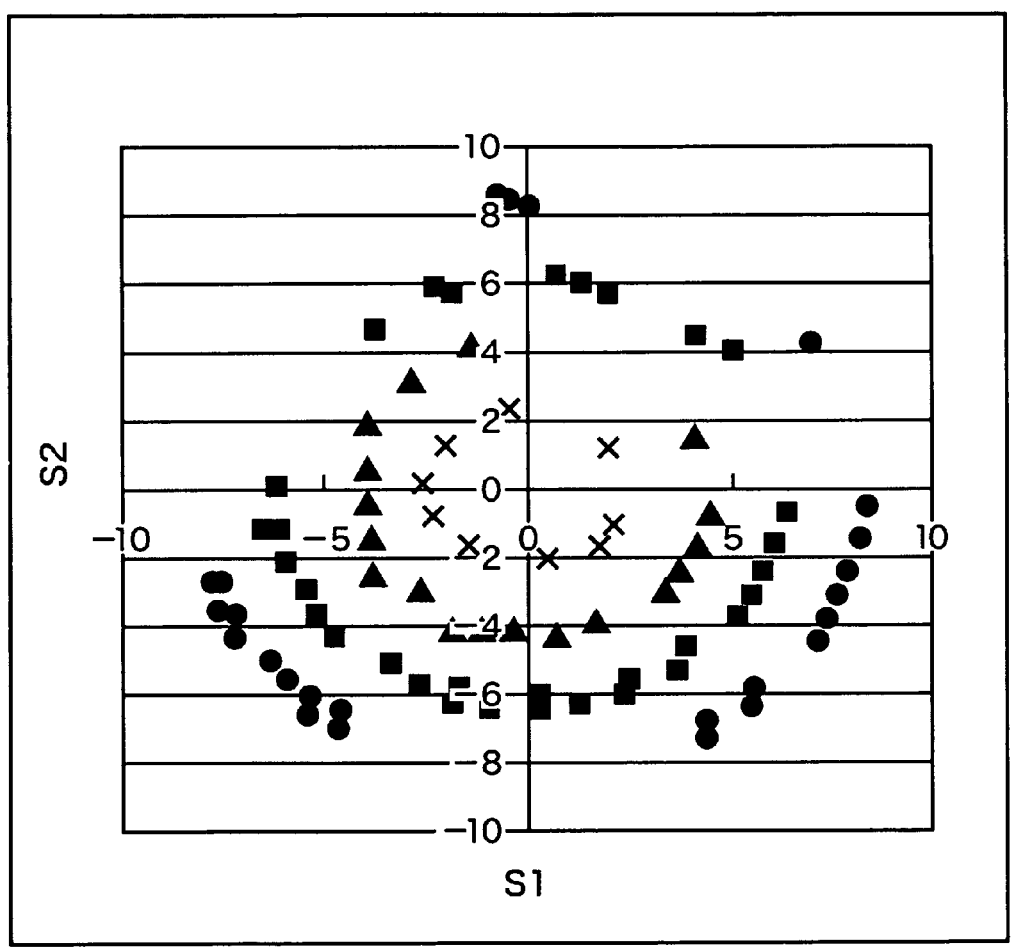
FIG. 12 is a view illustrating a section of the color solid of the Munsell color system in a case where luminance is constant.
Figure 13:
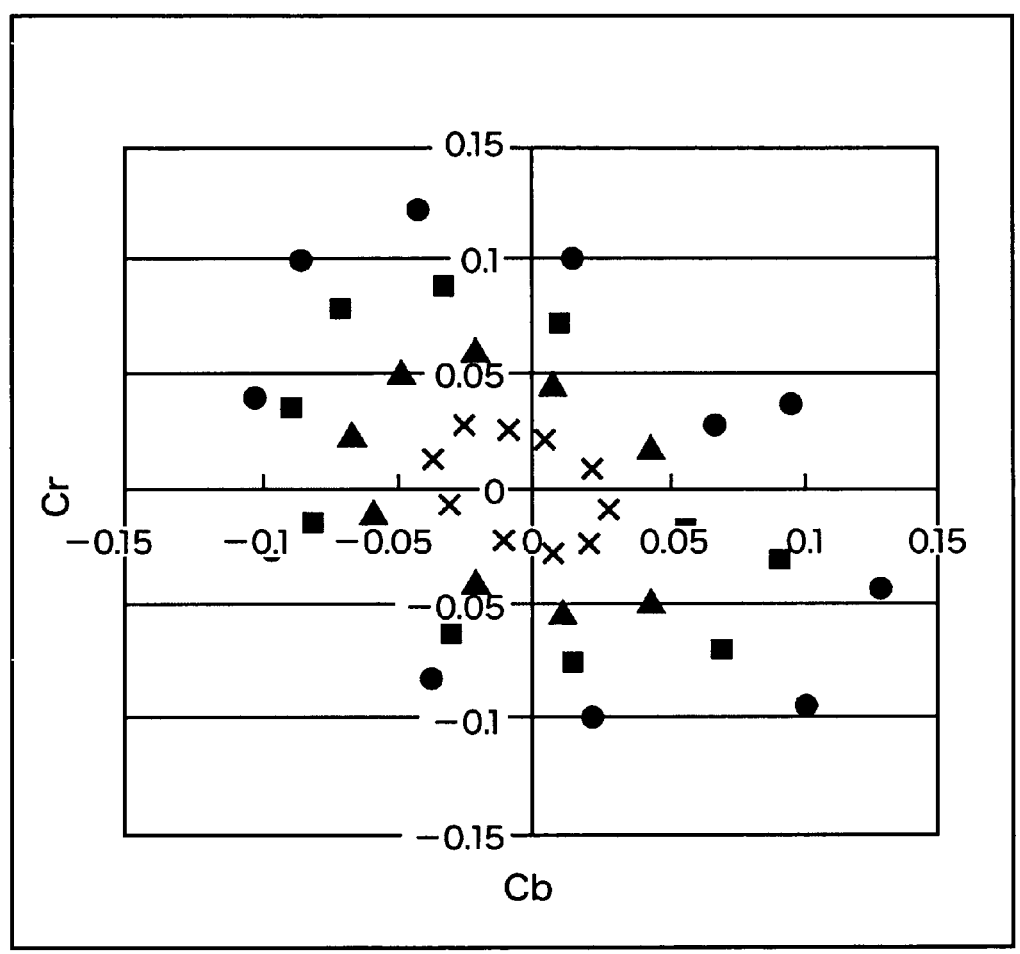
FIG. 13 is a view illustrating a section of the color solid of the YCrCb color system in a case where luminance is constant.

Color spaces (color systems) will now be compared with reference to FIGS. 12 and 13. FIG. 12 is a view illustrating a section of the color solid of the Munsell color system in a case where the luminance (the value) is constant. FIG. 13 is a view illustrating a section of the color solid of the YCrCb color system in the case where the luminance (the value) is constant.

In FIGS. 12 and 13, the hue (H) is represented by angle, and the chroma (C) is represented by radius. In FIG. 12, the abscissa indicates S1 (the value calculated in equation (18)), and the ordinate indicates S2 (the value calculated in equation (19)). In FIG. 13, the abscissa indicates Cb (Cb according to the YCrCb color system), and the ordinate indicates Cr (Cr according to the YCrCb color system). S1 and S2 correspond to Cb and Cr, respectively.

In FIGS. 12 and 13, "×", "Δ", "□", and "○" indicate cases where C=2, C=4, C=6, and C=8, respectively. The value of C is calculated in equation (22) regarding FIG. 12, and is calculated in equation (6) regarding FIG. 13.

In FIG. 12, at any value of the hue (angle from the center), distances from the center to positions representing each case where C=2, C=4, C=6, or C=8 are substantially constant. That is to say, these positions are substantially located on circumferences of concentric circles (on circumferences of concentric circles on the axes S1 and S2). In contrast, in FIG. 13, distances from the center to positions representing each case where C=2, C=4, C=6, or C=8 are different depending on the value of the hue (angle from the center), and these positions are not located on circumferences of concentric circles. That is to say, distortions occur. Thus, since the distortions occur in correction of color-difference signals in a color according to the YCrCb color system (correction with a constant Y/C ratio), as shown in FIG. 13, the appearance of the color changes after the correction. In contrast, since few distortions occur in correction of color-difference signals in the Munsell color system (correction with constant Munsell H and C values), as shown in FIG. 12, it is apparent that a faithful reproduction of a color can be achieved.

In the case described above, the gradation processing is performed on the Y signal (the luminance component). Alternatively, the gradation processing may be performed on the V signal (V according to the HVC color system).

Figure 14:
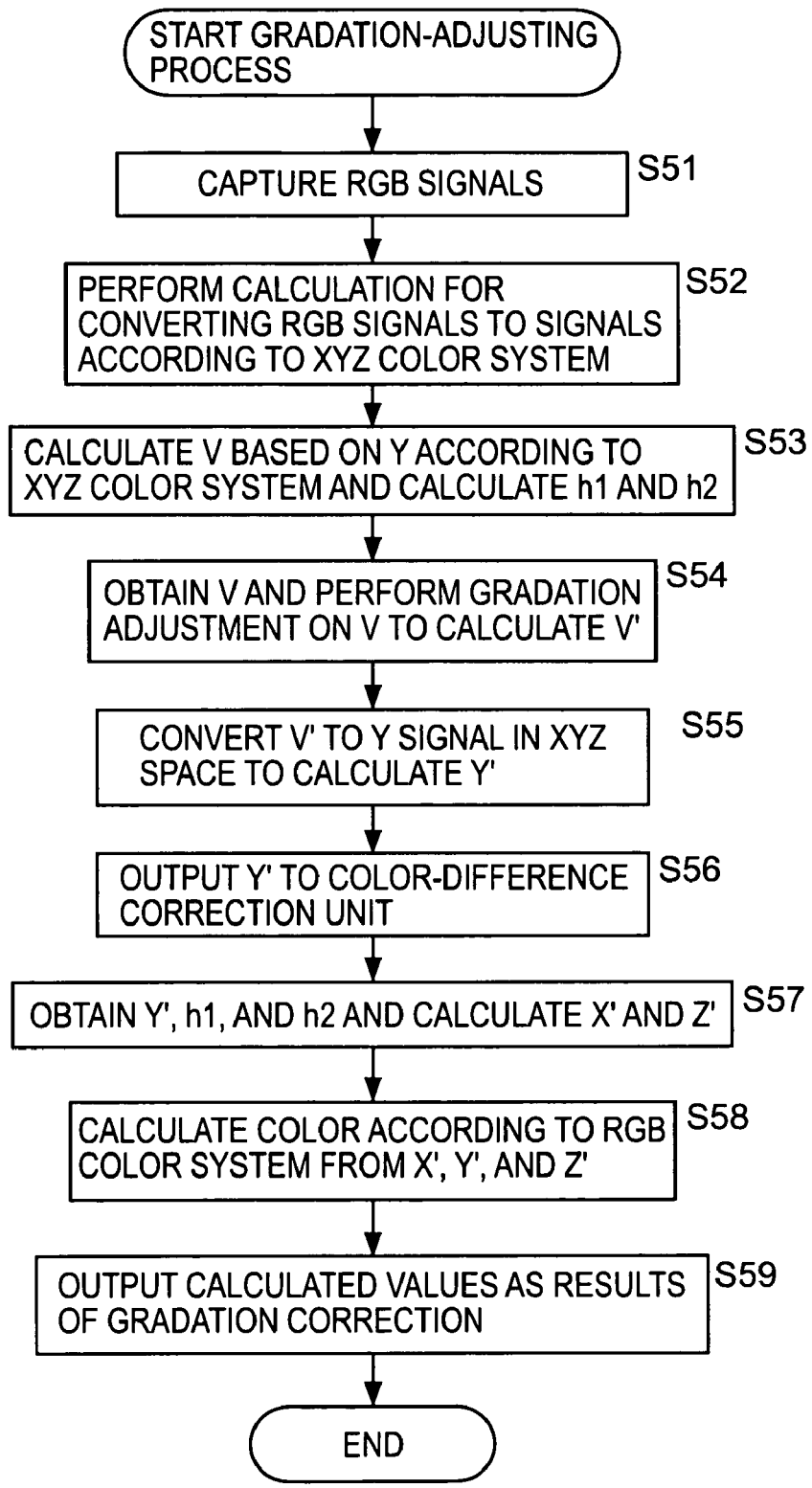
FIG. 14 is a flowchart illustrating another gradation-adjusting process in the digital still/video camera in FIG. 1.
Figure 15:
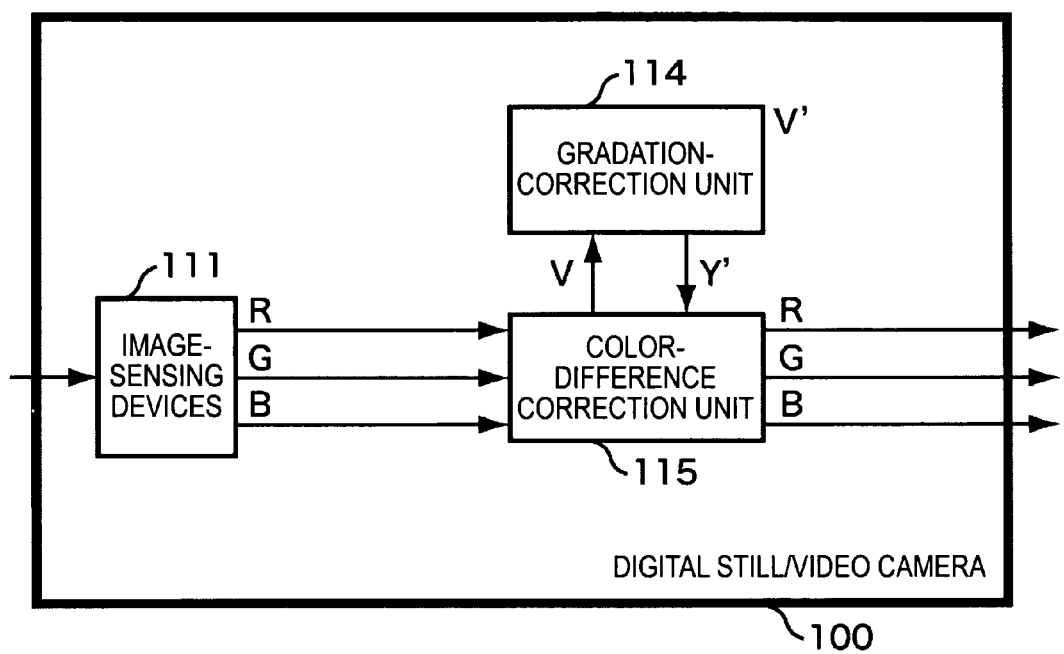
FIG. 15 is a block diagram illustrating the structure of a main part of another typical digital still/video camera to which the present invention is applied.

The gradation-adjusting process in which the gradation processing is performed on the signal V (the value component) according to the HVC color system will now be described with reference to a flowchart in FIG. 14. This process is started in response to a command for shooting images from a user. FIG. 15 illustrates the structure of a digital still/video camera 100 that performs the process in FIG. 14. The basic structure of the digital still/video camera 100 is substantially the same as that shown in FIG. 1, but the Y-matrix unit 112 and the C-matrix unit 113 are not necessary.

In step S51, image-sensing devices 111 in the digital still/video camera 100 capture an optical image from a subject as image signals and obtain RGB signals (a original color) from these image signals.

In step S52, a color-difference correction unit 115 retrieves the RGB signals of the original color obtained in the process in step S51, and performs a calculation according to equation (1) to convert the RGB signals of the original color to signals according to the XYZ color system.

In step S53, based on Y (Y according to the XYZ color system) calculated in the process in step S52, the color-difference correction unit 115 calculates V by substituting Y for a in the following equation (32) and then applying equation (32) to equation (31). The color-difference correction unit 115 outputs the calculated V (V according to the HVC color system) to a gradation-correction unit 114:

$$V = 0.23 \times f(Y) \quad (31)$$

$$f(a) = 11.6 \times a^{1/3} - 1.6 \quad (32)$$

Moreover, the color-difference correction unit 115 calculates values h1 and h2 represented by equations (10) and (11) describe above.

In step S54, the gradation-correction unit 114 obtains V (V according to the HVC color system) that is calculated by the color-difference correction unit 115 in the process in step S53 and that is input to the gradation-correction unit 114, and performs gradation adjustment of the value signal V.

In step S55, the gradation-correction unit 114 converts a value signal V' as the result of the gradation adjustment (the result of the gradation adjustment in the process in step S54) to a signal Y', which is a Y signal according to the XYZ color system. Specifically, Y' is derived from equations (33) and (34):

$$Y' = f\mathrm{inv}(V'/0.23) \quad (33)$$

$$f\mathrm{inv}(a) = ((a+1.6)/11.6)^3 \quad (34)$$

In step S56, the gradation-correction unit 114 outputs the signal Y' calculated in the process in step S55 to the color-difference correction unit 115.

As described above in the process shown in FIG. 9, when the original color (the color before the gradation conversion) is indicated by HVC (hue, value, and chroma) and the color after the gradation conversion is indicated by H'V'C', the hue H and the chroma C are preserved even after the gradation conversion. That is to say, H'=H and C'=C.

In step S57, the color-difference correction unit 115 obtains the values h1 and h2, which are calculated in the process in step S53, and Y', which is the Y signal according to the XYZ color system after the gradation adjustment and is generated in the process in step S55, and calculates X' and Z' according to the XYZ color system using equations (24) to (29) described above. The description is the same as that described above, and thus is omitted.

In step S58, the color-difference correction unit 115 calculates a color according to the color system of the original color from X'Y'Z' after the gradation conversion (X' and Z' are calculated by the color-difference correction unit 115 in step S57, and Y' is calculated by the gradation-correction unit 114 in step S56). In this case, since the original color is based on the RGB color system, the color according to the X'Y'Z' color system is converted to the color according to the RGB color system. Specifically, RGB values are calculated by substituting X'Y'Z' for XYZ in equation (2).

In step S59, the color-difference correction unit 115 outputs the respective calculation results as the results of the gradation adjustment (outputs them as the color according to the RGB color system), and the process is completed. In this case, RGB signals are output. In these output RGB signals, the hue (H) and the chroma (C) are preserved. Of course, the color according to the X'Y'Z' color system can be output as is instead of the RGB signals.

As described above, the present invention is applicable to the case where the gradation-adjusting process is performed on the signal V (the value component) according to the HVC color system. That is to say, even in the case where the gradation adjustment is performed on the signal V (the value component) according to the HVC color system, the hue (H) and the chroma (C) can be preserved.

When the gradation adjustment is performed as describe above, the color tone can be preserved by adjusting the color-difference signals so as to keep H and C (hue and chroma) according to the Munsell color system constant.

Moreover, when the luminance signal level is decreased by the gradation adjustment, the chroma can be prevented from being decreased more than necessary, and the color can be prevented from appearing dark.

Moreover, in a case where the color-difference-signal level is large and the luminance signal level is small, when the luminance signal level is increased by the gradation adjustment, saturation of the color-difference signals can be prevented.

Moreover, when the gradation adjustment is performed, the color-difference signals are adjusted so as to keep HC (hue and chroma) according to the Munsell color system constant. Accordingly, a color in which the hue and the chroma according to the Munsell color system, which matches a person's mood, are preserved can be reproduced.

The present invention can be applied not only to digital still/video cameras, but also to other image-processing apparatuses for handling image signals, for example, television receivers, printers, scanners, facsimiles, and copying machines. In this case, the color system of the original color is properly replaced with those used in the respective image-processing apparatuses.

Moreover, since an algorithm in which the Munsell H and C values are constant can be used in, for example, image-editing tools (for example, Photoshop™, the present invention can be applied to such tools.

The series of processes described above can be performed with hardware or software. In this case, the processes described above are performed by a personal computer 300 shown in FIG. 16.

Figure 16:
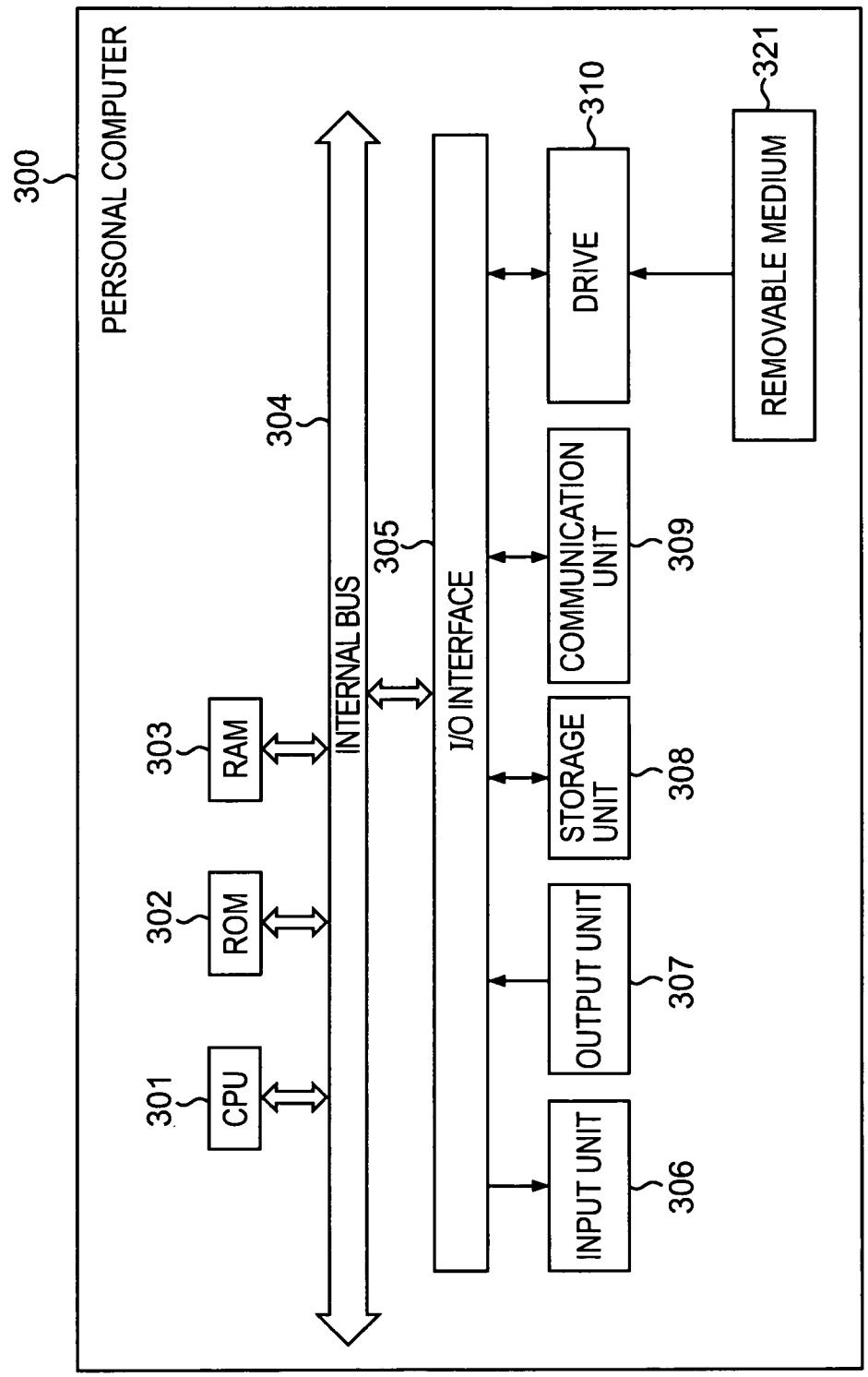
FIG. 16 is a block diagram illustrating the structure of a personal computer.

In FIG. 16, a central processing unit (CPU) 301 performs various types of processes according to programs stored in a read only memory (ROM) 302 or programs loaded from a storage unit 308 to a random access memory (RAM) 303. The RAM 303 also stores, for example, data required for the CPU 301 to perform various types of processes, as necessary.

The CPU 301, the ROM 302, and the RAM 303 are connected to each other through an internal bus 304. An I/O interface 305 is connected to the internal bus 304.

The following components are connected to the I/O interface 305: an input unit 306 including, for example, a keyboard and a mouse; a display including, for example, a cathode ray tube (CRT) or a liquid crystal display (LCD); an output unit 307 including, for example, a speaker; a storage unit 308 including, for example, a hard disk; and a communication unit 309 including, for example, a modem and a terminal adapter. The communication unit 309 performs communication processing through various types of networks including, for example, telephone lines and CATV.

A drive 310 is also connected to the I/O interface 305, as necessary, and a removable medium 321 including, for example, a magnetic disk, an optical disk, a magneto-optical disk, or a semiconductor memory, is mounted, as necessary. Computer programs read from the removable medium 321 are installed in the storage unit 308, as necessary.

When the series of processes is performed with software, programs constituting the software are installed from, for example, a network or a recording medium in, for example, a computer that is included in dedicated hardware or a general-purpose personal computer that can perform various types of functions with various types of programs installed therein.

As shown in FIG. 16, the recording medium is composed of a package medium that is distributed to users separately from the computer for providing programs and that includes a removable medium on which the programs are recorded. The recording medium is also composed of the ROM 302, a hard disk including the storage unit 308, and the like, which are distributed to users by including them in a main body of the device in advance and on which programs are recorded.

Herein, steps that describe the computer programs may include processes that are performed in chronological order as described, or processes that are performed not chronologically but in parallel or separately.

INDUSTRIAL APPLICABILITY

According to a first aspect of the present invention, when the gradation adjustment is performed, a color in which the hue and the chroma according to the Munsell color system, which matches a person's mood, are preserved can be reproduced. Especially, when the luminance signal level is decreased by the gradation adjustment, the chroma can be prevented from being decreased more than necessary, and the color can be prevented from appearing dark, unlike the known process in which the Y/C ratio is constant. Moreover, in a case where the color-difference-signal level is large and the luminance signal level is small, when the luminance signal level is increased by the gradation adjustment, saturation of the color-difference signals can be prevented.

According to a second aspect of the present invention, when the gradation adjustment is performed, a color in which the hue and the chroma according to the Munsell color system, which matches a person's mood, are preserved can be reproduced. Especially, when the luminance signal level is decreased by the gradation adjustment, the chroma can be prevented from being decreased more than necessary, and the color can be prevented from appearing dark, unlike the known process in which the Y/C ratio is constant. Moreover, in a case where the color-difference-signal level is large and the luminance signal level is small, when the luminance signal level is increased by the gradation adjustment, saturation of the color-difference signals can be prevented.

The invention claimed is:

1. An image-processing apparatus for adjusting gradation of image signals, comprising:
   gradation-correction means for generating a corrected value by correcting gradation of a value of a first element out of first to third elements according to a first color system, the value of the first element being defined by the input image signals;
   first calculating means for calculating values of fourth to sixth elements according to a second color system, based on values of the first to third elements according to the first color system, the values of the first to third elements being defined by the input image signals;
   second calculating means for calculating values defined by seventh and ninth elements according to a third color system represented by the seventh to ninth elements, based on the values of the fourth to sixth elements calculated by the first calculating means; and
   third calculating means for calculating values of the fourth to sixth elements according to the second color system, based on the value of the fourth element according to the second color system and the values that are calculated by the second calculating means and defined by the seventh and ninth elements according to the third color system.

2. The image-processing apparatus according to claim 1, wherein the first element according to the first color system is an element related to luminance or value.

3. The image-processing apparatus according to claim 1, wherein the seventh and ninth elements according to the third color system are elements related to hue and chroma, respectively.

4. The image-processing apparatus according to claim 3, wherein the second color system is the XYZ color system, and the third color system is the Munsell color system.

5. The image-processing apparatus according to claim 4, wherein the first color system is the YCrCb color system.

6. The image-processing apparatus according to claim 1, further comprising fourth calculating means for calculating the first to third elements according to the first color system, based on individual elements according to a color system of the image signals.

7. An image-processing method for adjusting gradation of image signals, comprising:
   a gradation-correction step of generating a corrected value by correcting gradation of a value of a first element out of first to third elements according to a first color system, the value of the first element being defined by the input image signals;
   a first calculating step of calculating values of fourth to sixth elements according to a second color system, based on values of the first to third elements according to the first color system, the values of the first to third elements being defined by the input image signals;
   a second calculating step of calculating values defined by seventh and ninth elements according to a third color system represented by the seventh to ninth elements, based on the values of the fourth to sixth elements calculated in the first calculating step; and
   a third calculating step of calculating values of the fourth to sixth elements according to the second color system, based on the value of the fourth element according to the second color system and the values that are calculated in the second calculating step and defined by the seventh and ninth elements according to the third color system.

8. A program for causing a computer to perform an image-processing method for adjusting gradation of image signals, the image-processing method comprising:
   a gradation-correction step of generating a corrected value by correcting gradation of a value of a first element out of first to third elements according to a first color system, the value of the first element being defined by the input image signals;
   a first calculating step of calculating values of fourth to sixth elements according to a second color system, based on values of the first to third elements according to the first color system, the values of the first to third elements being defined by the input image signals;
   a second calculating step of calculating values defined by seventh and ninth elements according to a third color system represented by the seventh to ninth elements, based on the values of the fourth to sixth elements calculated in the first calculating step; and
   a third calculating step of calculating values of the fourth to sixth elements according to the second color system, based on the value of the fourth element according to the second color system and the values that are calculated in the third calculating step and defined by the seventh and ninth elements according to the third color system.

9. An image-processing apparatus for adjusting gradation of image signals, comprising:
   first calculating means for calculating values of fourth to sixth elements according to a second color system, based on values of first to third elements according to a first color system, the values of the first to third elements being defined by the input image signals;
   second calculating means for calculating a value of an eighth element according to a third color system represented by seventh to ninth elements and values defined by the seventh and ninth elements, based on the values of the fourth to sixth elements calculated by the first calculating means;
   gradation-correction means for generating a corrected value by correcting gradation of the value of the eighth element calculated by the second calculating means;
   third calculating means for calculating a value of the fifth element according to the second color system from the corrected value generated by the gradation-correction means; and
   fourth calculating means for calculating the fourth to sixth elements according to the second color system, based on the value of the fifth element according to the second color system calculated by the third calculating means and the values that are calculated by the second calculating means and defined by the seventh and ninth elements.

10. The image-processing apparatus according to claim 9, wherein the eighth element according to the third color system is an element related to value.

11. The image-processing apparatus according to claim 9, wherein the seventh and ninth elements according to the third color system are elements related to hue and chroma, respectively.

12. The image-processing apparatus according to claim 11, wherein the second color system is the XYZ color system, and the third color system is the Munsell color system.

13. The image-processing apparatus according to claim 12, wherein the first color system is the RGB color system.

14. An image-processing method for adjusting gradation of image signals, comprising:
- a first calculating step of calculating values of fourth to sixth elements according to a second color system, based on values of first to third elements according to a first color system, the values of the first to third elements being defined by the input image signals;
- a second calculating step of calculating a value of an eighth element according to a third color system represented by seventh to ninth elements and values defined by the seventh and ninth elements, based on the values of the fourth to sixth elements calculated in the first calculating step;
- a gradation-correction step of generating a corrected value by correcting gradation of the value of the eighth element calculated in the second calculating step;
- a third calculating step of calculating a value of the fifth element according to the second color system from the corrected value generated in the gradation-correction step; and
- a fourth calculating step of calculating the fourth to sixth elements according to the second color system, based on the value of the fifth element according to the second color system calculated in the third calculating step and the values that are calculated in the second calculating step and defined by the seventh and ninth elements.

15. A program for causing a computer to perform an image-processing method for adjusting gradation of image signals, the image-processing method comprising:
- a first calculating step of calculating values of fourth to sixth elements according to a second color system, based on values of first to third elements according to a first color system, the values of the first to third elements being defined by the input image signals;
- a second calculating step of calculating a value of an eighth element according to a third color system represented by seventh to ninth elements and values defined by the seventh and ninth elements, based on the values of the fourth to sixth elements calculated in the first calculating step;
- a gradation-correction step of generating a corrected value by correcting gradation of the value of the eighth element calculated in the second calculating step;
- a third calculating step of calculating a value of the fifth element according to the second color system from the corrected value generated in the gradation-correction step; and
- a fourth calculating step of calculating the fourth to sixth elements according to the second color system, based on the value of the fifth element according to the second color system calculated in the third calculating step and the values that are calculated in the second calculating step and defined by the seventh and ninth elements.

* * * * *